US 8,508,822 B2

(12) United States Patent
Iguchi et al.

(10) Patent No.: US 8,508,822 B2
(45) Date of Patent: Aug. 13, 2013

(54) DECOLORING DEVICE CONSECUTIVELY DECOLORING IMAGE ON SHEET, MANAGEMENT DEVICE CAUSING DECOLORING DEVICE TO CONSECUTIVELY DECOLORING IMAGE ON SHEET, AND DECOLORING SYSTEM INCLUDING DECOLORING DEVICE AND MANAGEMENT DEVICE

(75) Inventors: Ken Iguchi, Shizuoka-ken (JP); Isao Yahata, Shizuoka-ken (JP); Takahiro Kawaguchi, Shizuoka-ken (JP); Hiroyuki Taguchi, Shizuoka-ken (JP); Hiroyuki Tsuchihashi, Shizuoka-ken (JP); Hiroyuki Taki, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 182 days.

(21) Appl. No.: 13/205,471

(22) Filed: Aug. 8, 2011

(65) Prior Publication Data
US 2012/0038958 A1 Feb. 16, 2012

Related U.S. Application Data

(60) Provisional application No. 61/372,431, filed on Aug. 10, 2010.

(51) Int. Cl.
*H04N 1/46* (2006.01)
*H04N 1/40* (2006.01)
*H04N 1/04* (2006.01)
*G06F 3/12* (2006.01)
*G11C 11/34* (2006.01)
*B60J 10/00* (2006.01)
*G03G 15/00* (2006.01)

(52) U.S. Cl.
USPC .......... 358/505; 358/1.15; 358/443; 358/474; 365/185.03; 365/185.29; 156/221; 399/401

(58) Field of Classification Search
None
See application file for complete search history.

(56) References Cited

U.S. PATENT DOCUMENTS

| 5,083,170 A | * | 1/1992 | Sawada et al. | 399/401 |
|---|---|---|---|---|
| 2001/0008164 A1 | * | 7/2001 | Sano et al. | 156/221 |
| 2009/0073507 A1 | * | 3/2009 | Fukuda | 358/474 |
| 2011/0065056 A1 | | 3/2011 | Iguchi et al. | |

OTHER PUBLICATIONS

U.S. Appl. No. 13/042,412, Yahata et al.

* cited by examiner

*Primary Examiner* — Tammy Pham
*Assistant Examiner* — Frantz Bataille
(74) *Attorney, Agent, or Firm* — Patterson & Sheridan, L.L.P.

(57) ABSTRACT

A communication unit transmits image data of a preceding sheet scanned to a management device communicating with a decoloring device and receives from a management device determination data which is produced by the management device based on the image data and indicates at least whether or not the preceding sheet is reusable and receives ability data of the management device or reception time indication data. A control unit conveys the preceding sheet to a predetermined conveyance destination based on the determination data and feeds sheets at a timing at which the leading end of a following sheet does not run into the tail end of the preceding sheet even if the preceding sheet is held until the determination data is received based on the ability data or the reception time indication data.

19 Claims, 14 Drawing Sheets

DECOLORING DEVICE CONSECUTIVELY DECOLORING IMAGE ON SHEET, MANAGEMENT DEVICE CAUSING DECOLORING DEVICE TO CONSECUTIVELY DECOLORING IMAGE ON SHEET, AND DECOLORING SYSTEM INCLUDING DECOLORING DEVICE AND MANAGEMENT DEVICE

CROSS-REFERENCE TO RELATED APPLICATION

This application is based upon and claims the benefit of priority from U.S. provisional application 61/372,431, filed on Aug. 10, 2010; the entire contents of which are incorporated herein by reference.

FIELD

Embodiments described herein relate generally to a technology in which images on a plurality of sheets are consecutively decolored.

BACKGROUND

Conventionally, in a decoloring device, it is known that an image on a sheet is first scanned, decoloring possibility determination is performed based on the scanned image data, and then a decoloring process is performed only for a sheet that is determined to be decolorable. Since the price of such a decoloring device is expensive if the device itself performs decoloring possibility determination, there is a case where a management device performs the decoloring possibility determination, and the decoloring device receives the determination result from the management device.

However, with regard to such a decoloring device, when there is a PC (Personal Computer) with low calculation and communication abilities as a management device, it takes time for the PC to produce the determination result, and additionally, it takes time to transmit the determination result to the decoloring device. The decoloring device does not perform the decoloring process until the device receives the determination result from the PC. For that reason, the decoloring device is not able to convey the sheet to a decoloring unit until the device receives the determination result from the PC even after a scanning unit scans an image on the sheet, and it is necessary to hold the sheet between the scanning unit and the decoloring unit temporarily.

Accordingly, if it takes time to receive the determination result from the PC when a series of processes is to be consecutively performed for a sheet in the decoloring device, there is concern that a succeeding following sheet may run into a preceding sheet held between the scanning unit and the decoloring unit, causing a sheet jam.

DETAILED DESCRIPTION

Generally, according to an embodiment, a decoloring device includes a sheet conveying path, a sheet feeding unit, a scanning unit, a communication unit, a decoloring unit, and a control unit. The sheet conveying path conveys a sheet to each unit in the device. The sheet feeding unit feeds a sheet on which an image is formed with a decolorable colorant to the sheet conveying path from a sheet-stacking part. The scanning unit is provided downstream of the sheet feeding unit on the sheet conveying path and scans an image on a sheet. The communication unit transmits image data of a preceding sheet scanned by the scanning unit to a management device communicating with the decoloring device and receives from the management device determination data which is produced by the management device based on the image data and indicates at least whether or not the preceding sheet is reusable and receives ability data of the management device or reception time indication data both of which are related to time taken for the decoloring device to receive the determination data from the management device. The decoloring unit is provided downstream of the scanning unit on the sheet conveyance path and decolors an image on a sheet. The control unit conveys the preceding sheet to a predetermined conveyance destination based on the determination data and feeds sheets at a timing at which the leading end of a following sheet does not run into the tail end of the preceding sheet even if the preceding sheet is held until the determination data is received based on the ability data or the reception time indication data.

Figure 1:
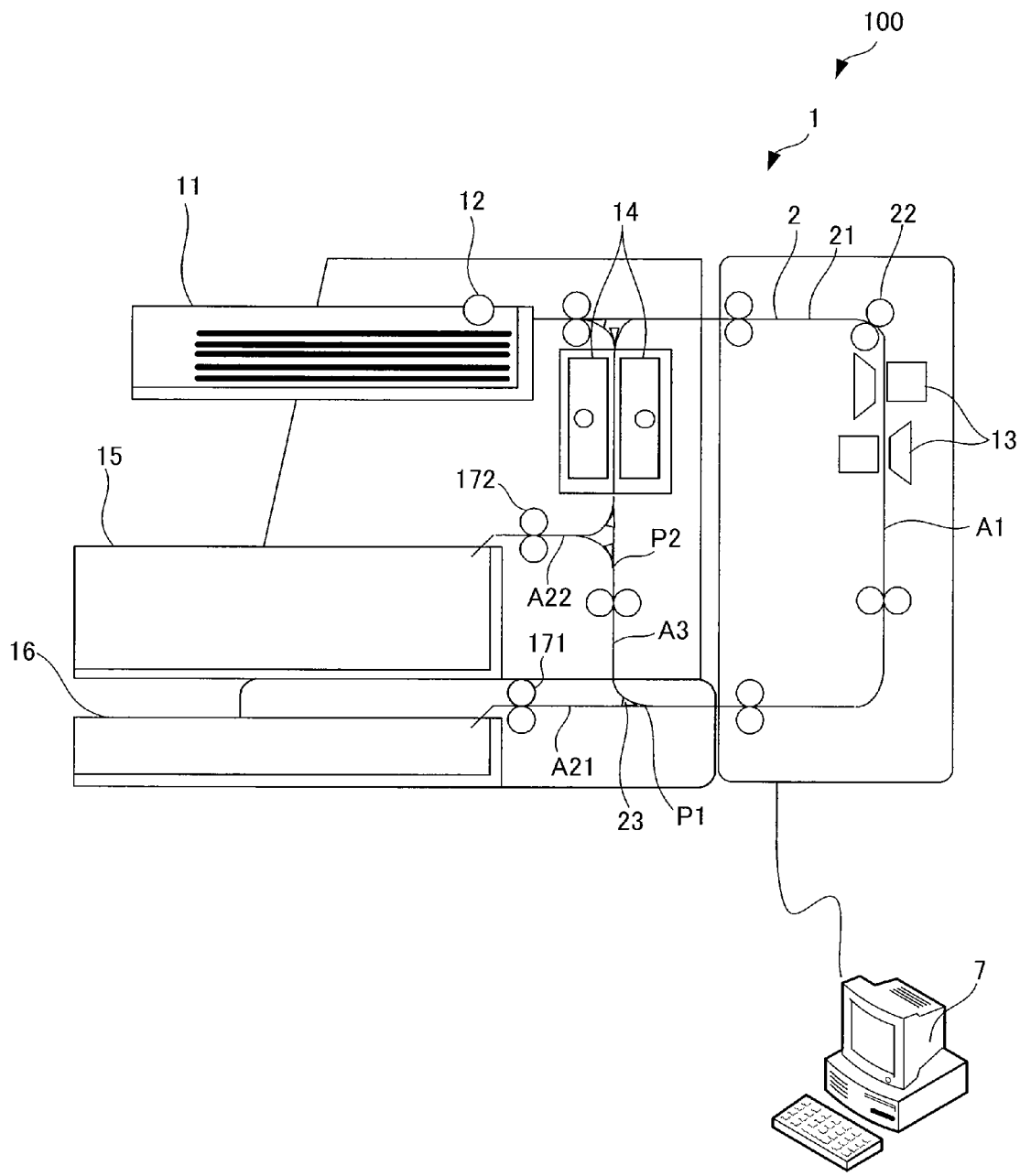
FIG. 1 is a diagram showing a decoloring system.

Hereinafter, each embodiment will be described with reference to drawings.
(First Embodiment)
FIG. 1 is a diagram showing a decoloring system 100.
The decoloring system 100 includes a decoloring device 1 and a management device 7 which is communicably connected to the decoloring device 1 by a data bus, or the like.
The decoloring device 1 includes a sheet feeding tray 11 (sheet-stacking part), a sheet feeding unit 12, a sheet conveying path 2, a scanning unit 13, a decoloring unit 14, a reusable sheet tray 15, a non-reusable sheet tray 16, and sheet discharge units 171 and 172.
The sheet feeding tray 11 is stacked with A4 size sheets and the like thereon. The sheets that the sheet feeding tray 11 accommodates have images formed with a decolorable colorant used for decoloring by heating.

The sheet feeding unit 12 includes a pickup roller, a sheet feeding roller, and a separation roller, and feeds sheets stacked on the sheet feeding tray 11 to the sheet conveying path 2.

The sheet conveying path 2 conveys sheets to each part in the device 1. The sheet conveying path 2 includes a circular-shaped sheet conveying path A1 which conveys sheets fed from the sheet feeding unit 12 from the scanning unit 13 to the decoloring unit 14 and back to the scanning unit 13. On the sheet conveying path 2, there are sheet discharge conveying paths A21 and A22 which discharge sheets, and branch points P1 and P2 at which the sheet discharge conveying paths are branched to a decoloring conveying path A3 which conveys sheets to the decoloring unit 14 downstream of the scanning unit 13 in the sheet conveying direction. On the sheet conveying path 2, the sheet feeding unit 12 and scanning unit 13 joins downstream of the decoloring unit 14 in the sheet conveying direction. The sheet conveying path 2 includes the main body of the sheet conveying path 21 which guides sheets to the sheet conveying direction, a plurality of conveyance rollers 22 which send sheets downstream of the sheet conveying direction, and a plurality of flappers 23 which is provided at each branch point and distribute sheets to any of the sheet conveying paths.

The scanning unit 13 is provided downstream of the sheet feeding unit 12 on the sheet conveying path 2 and scans an image of a sheet. Two scanning units 13 are provided for scanning the front surface and the back surface of a sheet, and scan images on the front and back surfaces at one time. As the scanning unit 13, for example, a CCD (Charge Coupled Device) image sensor can be employed.

The decoloring unit 14 is provided downstream of the scanning unit 13 on the sheet conveying unit 2, and decolors an image on a sheet by heating the sheet. Two decoloring units 14 are provided for decoloring the front surface and the back surface of a sheet, and can decolor images on both surfaces of a sheet at one time.

The reusable sheet tray 15 accommodates sheets on which images are decolored thereby making the sheets reusable.

The non-reusable sheet tray 16 accommodates on which images are not completely decolored thereby making the sheets not reusable.

The sheet discharge units 171 and 172 include discharge rollers, and discharge sheets to the trays 15 and 16.

Generally, there are cases where decoloring residue is generated in the decoloring device; however, sheets printed with ordinary data are reusable even if there is slight decoloring residue thereon. Since sheets printed with specific data such as confidential data, however, are not reusable if decoloring residue is generated thereon, the sheets are not suitable for objects for the decoloring process.

The management device 7 receives image data of a sheet from the decoloring device 1 and performs decoloring possibility determination for determining whether or not the image data includes prohibited data such as confidential data for which decoloring is prohibited. In addition, the management device 7 received the decolored image data of the sheet from the decoloring device 1, and performs reuse possibility determination for determining whether or not the sheet is reusable under the decoloring residue conditions of the sheet based on the received image data.

Figure 2:
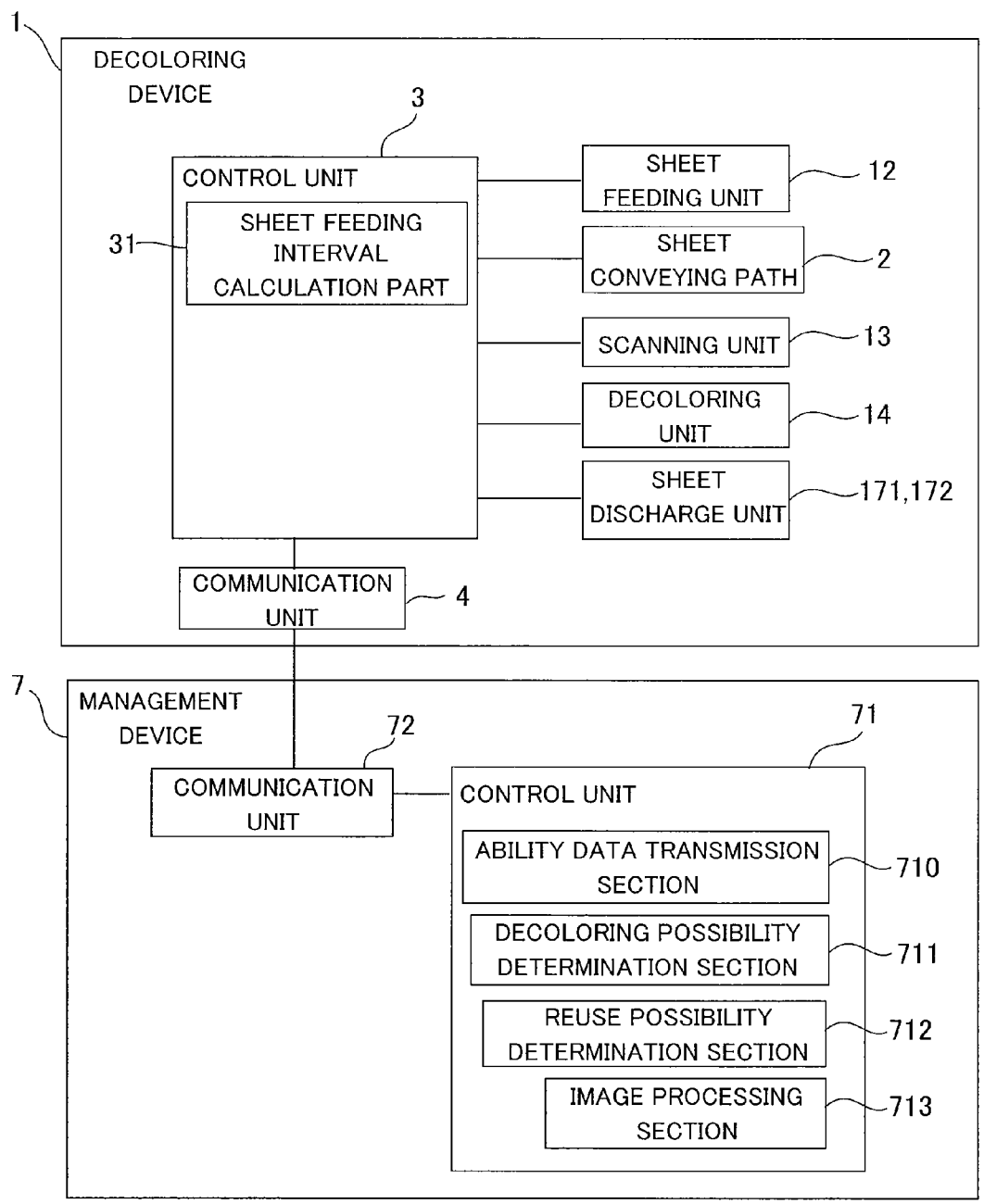
FIG. 2 is a functional block diagram of a decoloring device and a management device.

FIG. 2 is a functional block diagram of the decoloring device 1 and the management device 7.

The decoloring device 1 includes a control unit 3 and a communication unit 4.

The control unit 3 controls includes a processor, an ASIC (Application Specific Integrated Circuit), a memory, and an HDD (Hard Disk Drive), and controls the entire decoloring device 1. The control unit 3 includes, as a functional unit, a sheet feeding interval calculation part 31 which calculates the sheet feeding intervals.

The communication unit 4 receives a decoloring possibility determination result and a reuse possibility determination result (determination data) generated by the management device 7 based on image data, indicating the conveyance destination of the sheet, and ability data of the management device 7 which is related to the time taken for the decoloring device 1 to receive the determination results.

The management device 7 is a general-purpose PC, and includes a control part 71 and a communication part 72.

The control part 71 includes a processor, an ASIC, a memory, and an HDD, and controls the entire management device 7. The control part 71 includes, as a functional part, a ability data transmission section 710 which transmits to the decoloring device 1 the ability data used for calculating the time taken for the decoloring device 1 to receive the decoloring possibility determination result and the reuse possibility determination result ( ). In addition, the control part 71 includes, as a functional part, a decoloring possibility determination section 711 that performs decoloring possibility determination, a reuse possibility determination section 712 that performs reuse possibility determination, and an image processing section 713. The image processing section 713 performs image processing for image data received from the decoloring device 1 in order to perform decoloring possibility determination and reuse possibility determination.

Figure 3:
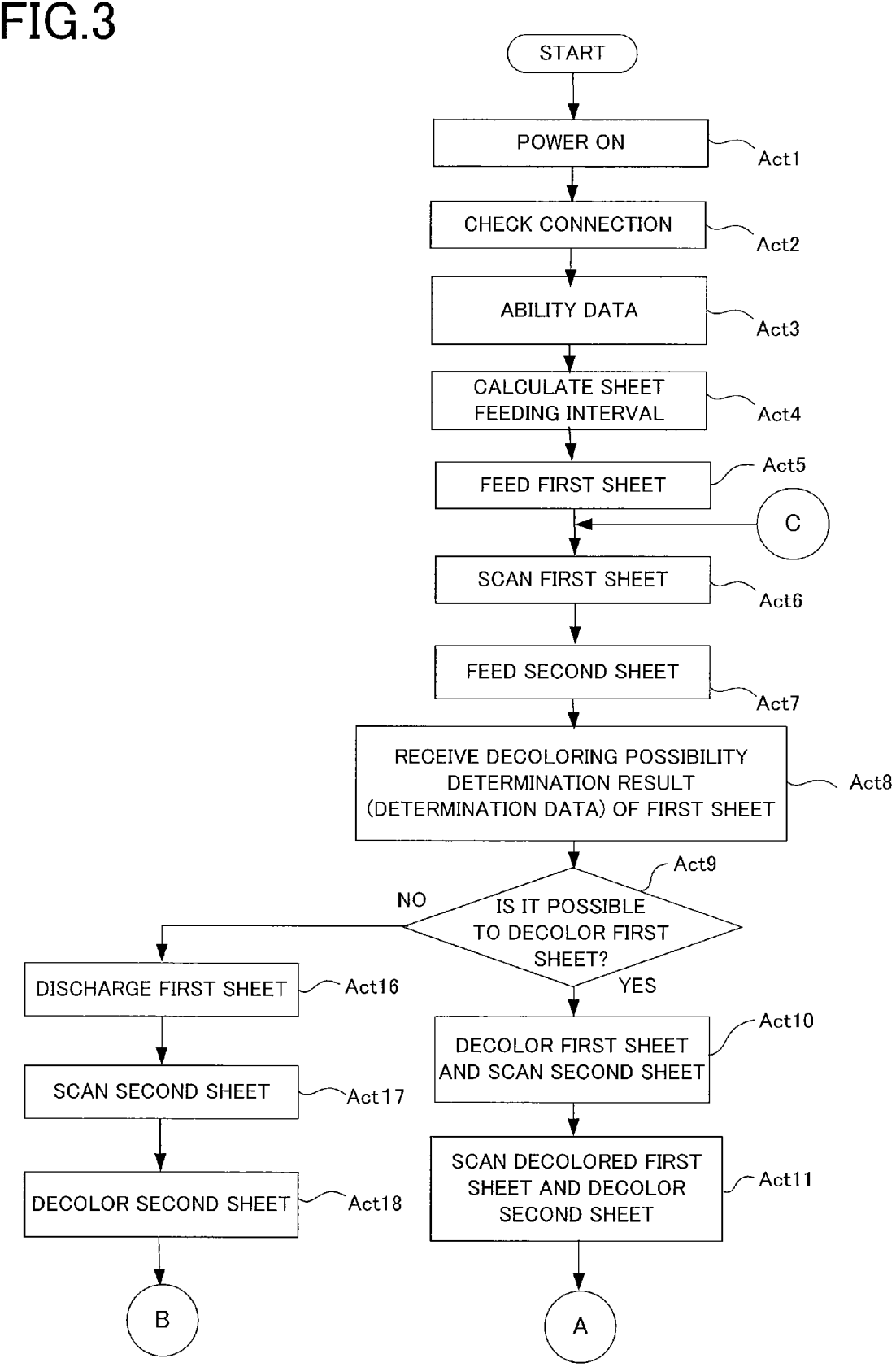
FIG. 3 is a flowchart showing a decoloring process by the decoloring device.
Figure 4:
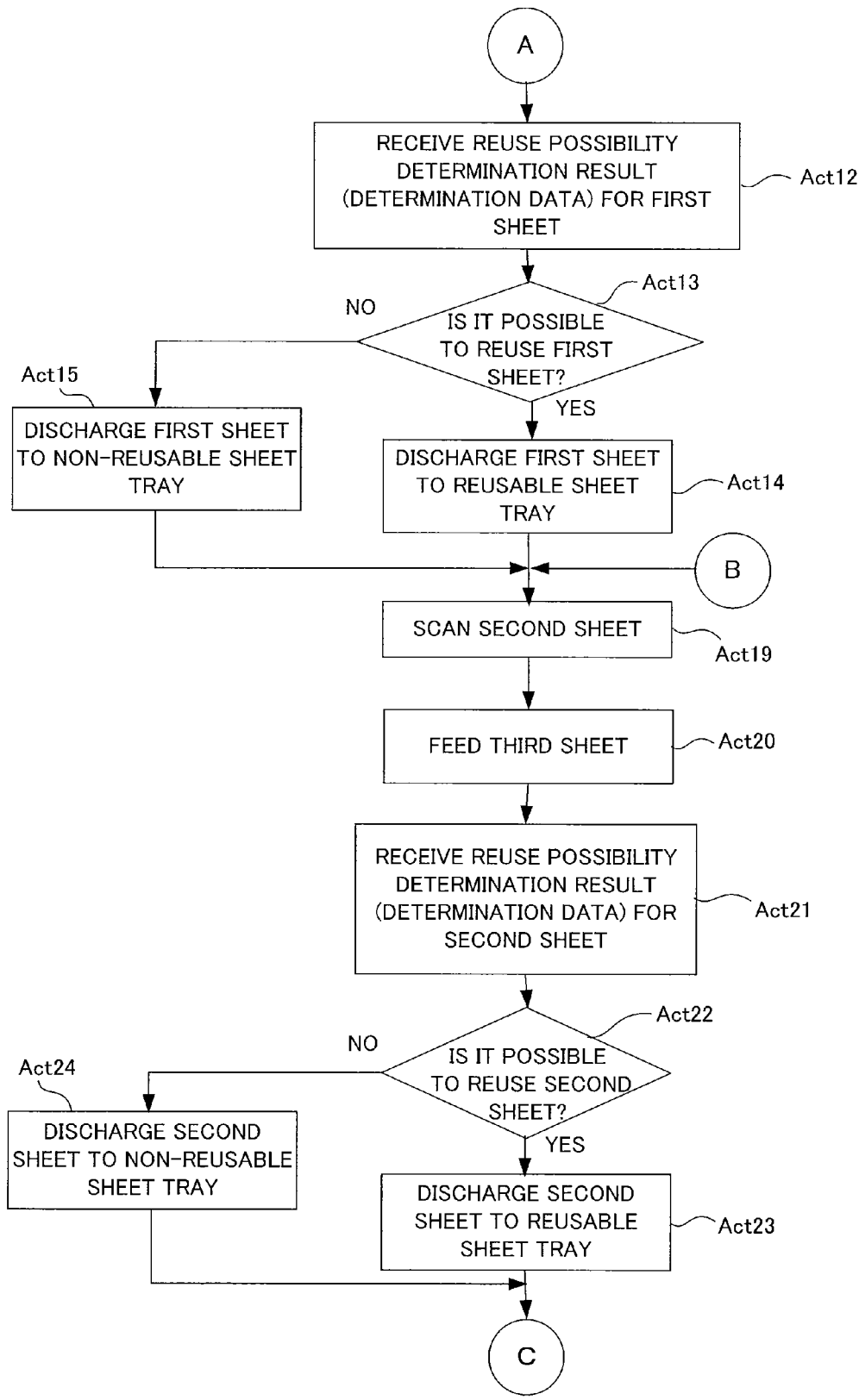
FIG. 4 is a flowchart showing the decoloring process by the decoloring device.

Hereinbelow, a decoloring process by the decoloring device 1 will be described referring to flowcharts of FIGS. 3 and 4. The decoloring device 1 performs the decoloring process in a way that the processor reads a program non-temporarily stored in the memory.

The decoloring device 1 checks the connection to the management device 7 (Act 2) when the power is on (Act 1). The control part 71 of the management device 7 (the ability data transmission section 710) transmits ability data to the decoloring device 1 if the connection to the decoloring device 1 is confirmed. The ability data of the management device 7 is data used for the decoloring device 1 to calculate the time taken for the decoloring device 1 to receive a decoloring possibility determination result and a the reuse possibility determination result after sheet feeding is started.

The ability data includes data used by the decoloring device 1 to calculate ((A) the time taken for the management device 7 to finish determination from completing reception of the image data). Such ability data includes the performance of the memory in the management device 7 (including the memory size and the transfer rate), the number of processors (or the number of cores of the processor), the performance of the processor (including the cache size and the bus width), and the model number of the management device 7.

In addition, the ability data includes data used by the decoloring device 1 to calculate ((B) the time taken for the management device 7 to complete reception of the image data). Such ability data includes the rate of execution by the data bus (LAN (Local Area Network)). The management device 7 measures and calculates the capacity or capabilities of the data bus.

The decoloring device 1 receives the ability data from the management device 7 (Act 3).

The control unit 3 (sheet feeding interval calculation part 31) of the decoloring device 1 calculates the sheet feeding interval at which the leading end of a following sheet does not run into the tail end of a preceding sheet based on the ability data even when the preceding sheet is held until the decoloring possibility determination result and the reuse possibility determination result are received (Act 4).

The control unit 3 calculates (A) the time taken for the management device 7 to finish determination (of the decoloring possibility determination result and the reuse possibility determination result) from completing reception of the image data based on the memory and processor performance, or the like of the management device 7 included in the ability data. In addition, when the ability data is the model number of the management device 7, (A) the time taken for the management device 7 to finish determination from completing reception of the image data is acquired from a data table in the decoloring device 1 associating the model numbers of various management devices with the time taken from the time when the decoloring device 1 completes transmission of the image data to the time when the model number of the corresponding management device finishes determination.

In addition, the control unit 3 calculates (B) the time taken for the management device 7 to complete reception of the image data based on the rate of execution by the data bus included in the ability data.

The control unit 3 calculates the sheet feeding interval taking ((C) the time taken for the decoloring device 1 to start transmission of the image data from the start of sheet feeding, in addition to (A) the time taken for the management device 7 to finish determination from completing reception of the image data and (B) the time taken for the management device 7 to complete reception of the image data into consideration. (C) the time taken for the decoloring device 1 to start transmission of the image data from the start of sheet feeding may be stored in the memory in advance as a prescribed value, or may be calculated each time by the control unit 3. (C) the time taken for the decoloring device 1 to start transmission of the image data from the start of sheet feeding is calculated based on the distance from the sheet feeding unit 12 to the scanning unit 13, the rate of sheet conveyance, and the time taken from when the leading end of a sheet passes the scanning unit 13 to the time when the image data is transmitted to the management device 7.

It is considered that ((D) the time taken for the management device 7 from the time when determination is finished to the time when the determination result is transmitted to the decoloring device 1) is added to (A) to (C), as the time taken for the decoloring device 1 to receive the determination result from the start of sheet feeding. Since the data size of the determination result, however, is smaller than that of the image data, (D) the time taken for the management device 7 from the time when determination is finished to the time when the determination result is transmitted to the decoloring device 1 can be ignored.

The control unit 3 calculates the time taken for the decoloring device 1 to receive the determination result from the start of sheet feeding based on the ability data, and calculates the sheet feeding interval at which the leading end of the following sheet does not run into the tail end of the preceding sheet from that time, even if the preceding sheet is held until the determination result is received (Act 4).

Figure 5:
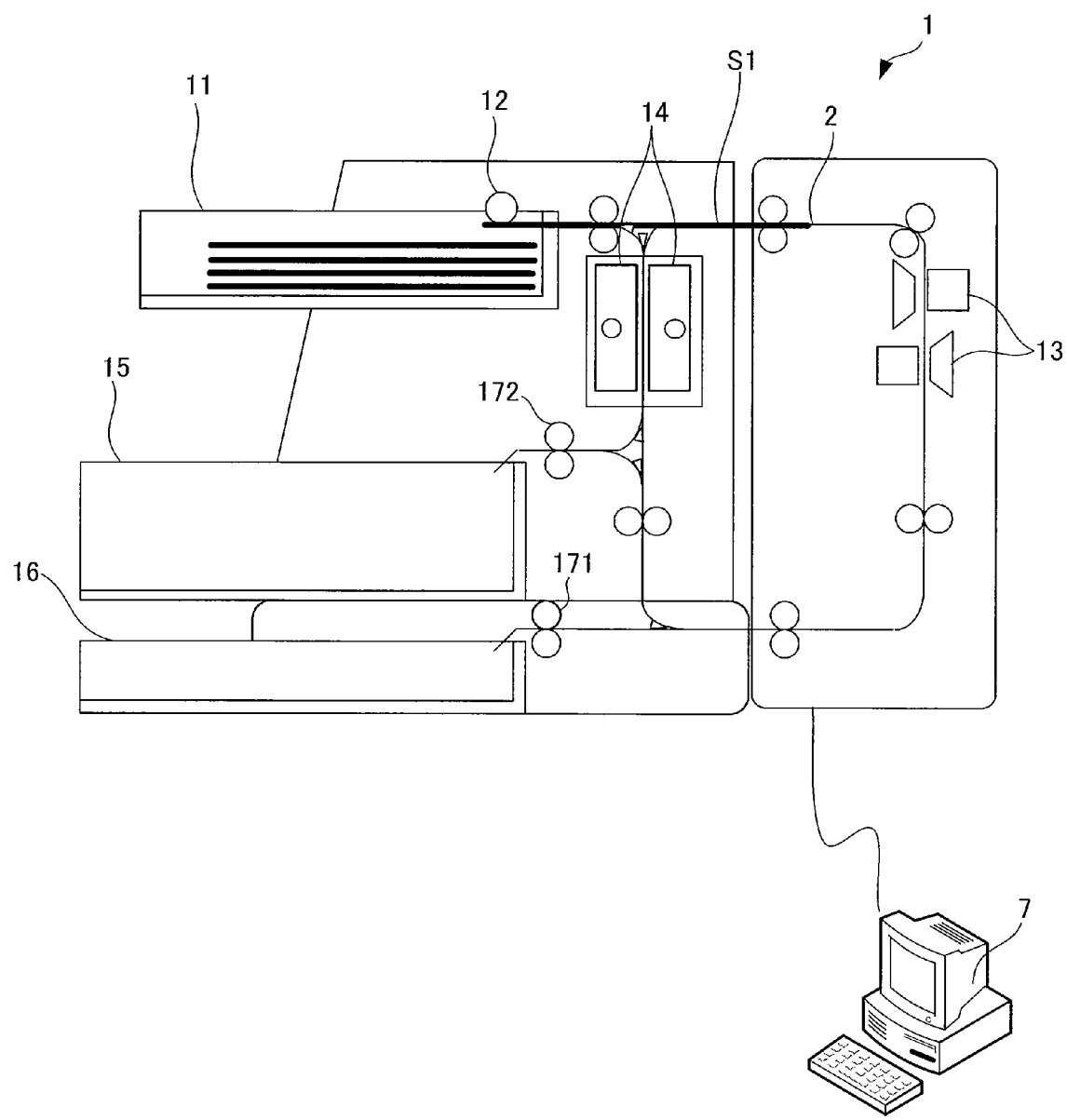
FIG. 5 is a diagram showing the appearance of a sheet feeding unit taking out a sheet from a sheet feeding tray.

Subsequently, the control unit 3 causes the sheet feeding unit 12 to take a first sheet S1 (preceding sheet) on which an image is formed with a decolorable colorant from the sheet feeding tray 11 (FIG. 5) to feed the sheet to the sheet conveying path 2 (Act 5).

Figure 6:
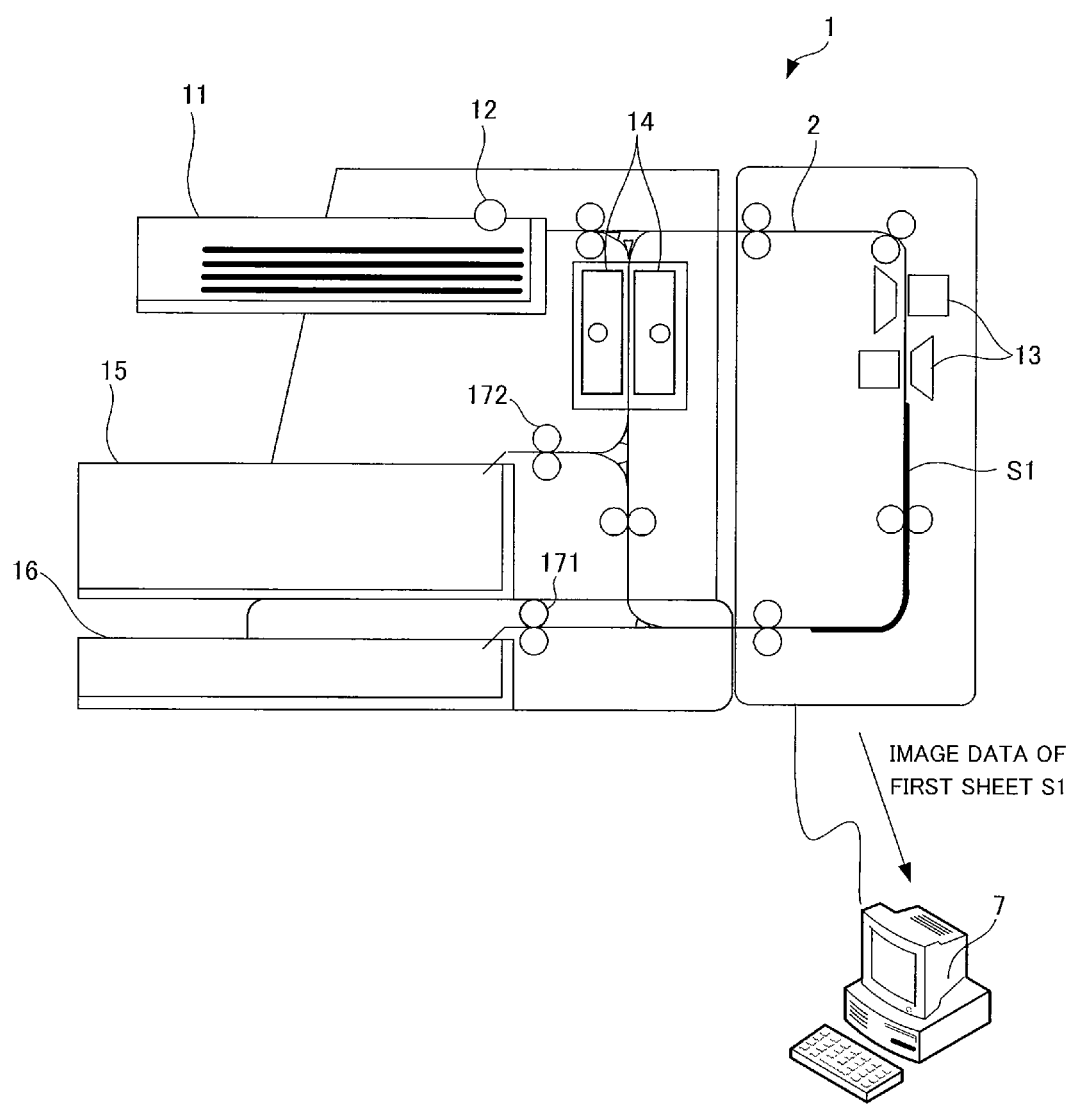
FIG. 6 is a diagram showing the appearance of a scanning unit scanning an image on a first sheet.

The control unit 3 causes the scanning unit 13 to scan the image on the first sheet S1 and transmits the image data to the management device 7 as shown in FIG. 6 (Act 6). The control unit 3 makes the sheet of which the image is scanned standby between the scanning unit 13 and the decoloring unit 14 on the sheet conveying path 2.

The management device 7 (image processing section 713) performs image processing for the image data. The management device 7 (decoloring possibility determination section 711) determines whether or not the image data includes prohibited data such as confidential data for which decoloring is prohibited, based on the image data which underwent image processing. Specifically, the management device 7 determines that the sheet is not decolorable when prohibited data is included in the image data, and determines that the sheet is decolorable when prohibited data is not included in the image data.

The control unit 3 feeds a second sheet S2 (following sheet) to the sheet conveying path 2 (Act 7) at the calculated sheet feeding interval after the first sheet S1 is fed.

Figure 7:
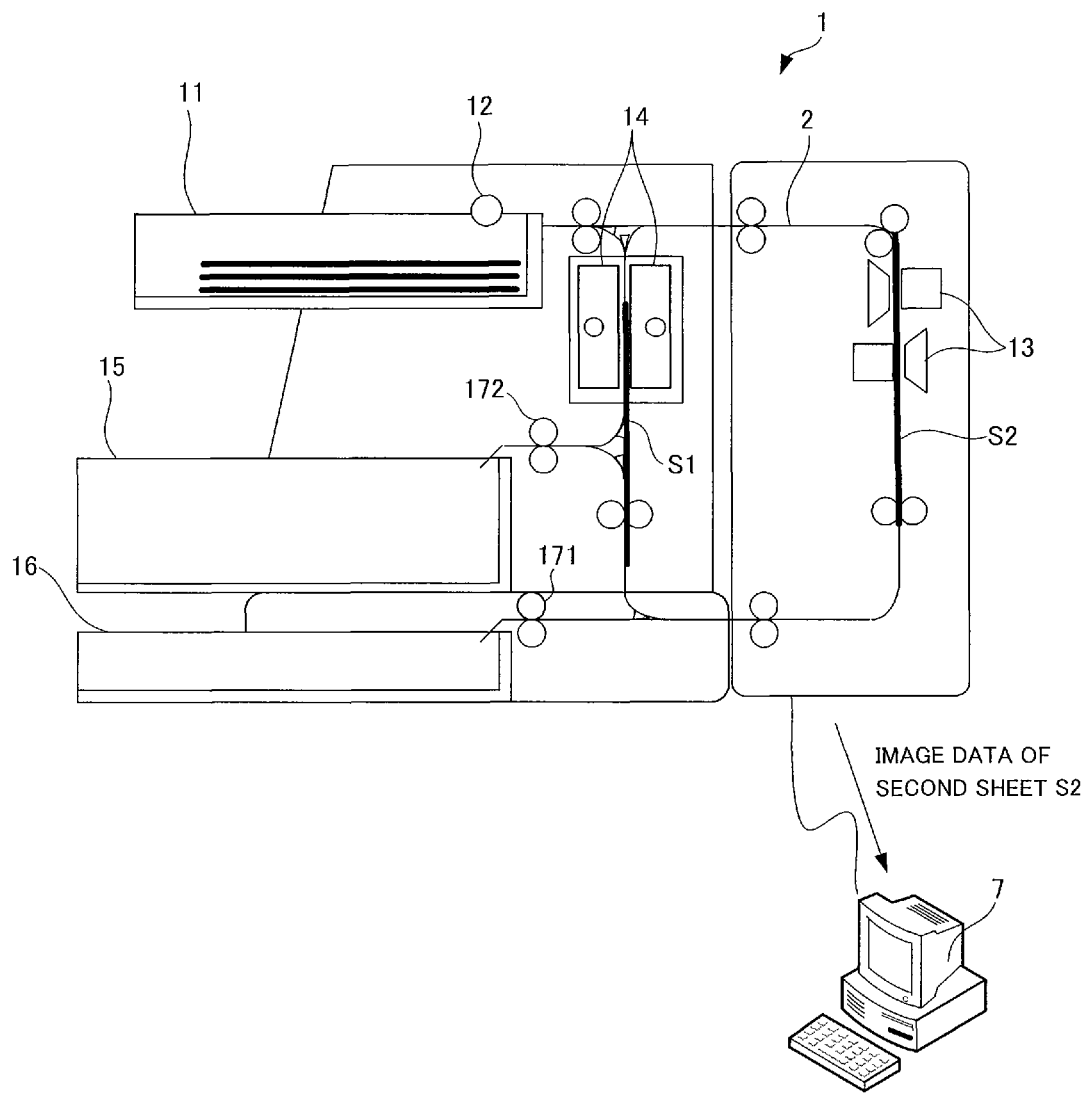
FIG. 7 is a diagram showing the positions of the first and second sheets when the second sheet is scanned.

The control unit 3 causes the first sheet S1 that stands by between the scanning unit 13 and the decoloring unit 14 to be conveyed to the decoloring unit 14 as shown in FIG. 7 when the decoloring possibility determination result (determination data) received from the management device 7 (Act 8) is that the first sheet S1 is decolorable (Act 9: YES). Then, the control unit 3 causes the decoloring unit 14 to decolor the image on the first sheet S1, and causes the scanning unit 13 to scan an image on the second sheet S2 (Act 10).

Figure 8:
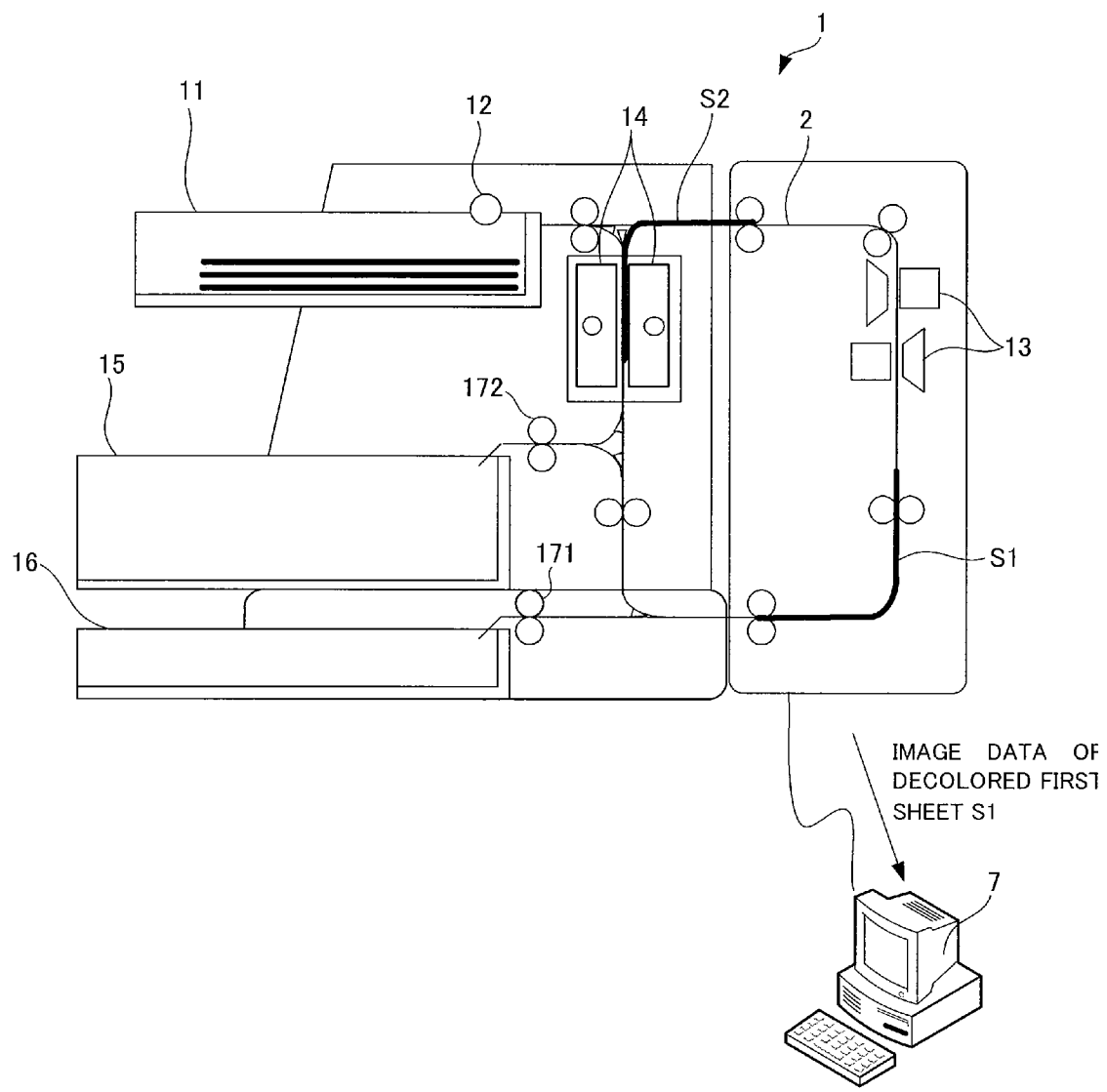
FIG. 8 is a diagram showing the positions of the first and the second sheets when the second sheet is decolored.

The control unit 3 causes the scanning unit 13 to scan the decolored surface of the first sheet S1 subjected to the decoloring process to transmit the image data to the management device 7, and causes the decoloring unit 14 to decolor the second sheet S2 as shown in FIG. 8 (Act 11).

The management device 7 performs the image processing for the image data on the decolored surface of the first sheet S1. Then, the management device 7 (reuse possibility determination section 712) performs reuse possibility determination to determine that the first sheet S1 is reusable when the quantity of decoloring residue of the first sheet S1 is equal to or smaller than a predetermined quantity, and to determine that the first sheet S1 is not reusable when the quantity of decoloring residue of the first sheet S1 is equal to or larger than the predetermined quantity based on the image data subjected to the image processing, and transmits the determination result (determination data) to the decoloring device 1.

The control unit 3 receives the reuse possibility determination result (Act 12).

Figure 9:
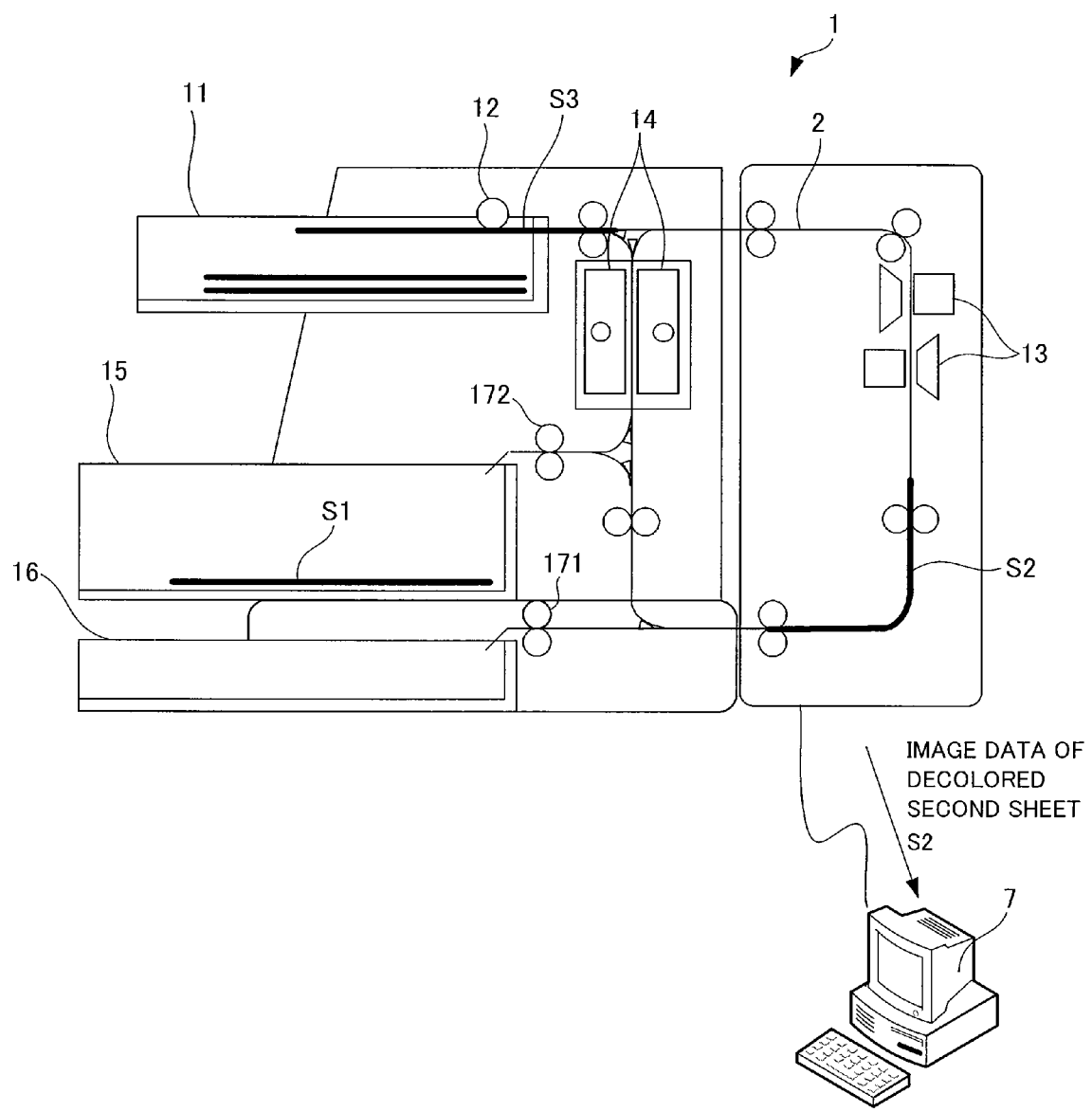
FIG. 9 is a diagram showing the positions of the first to third sheets when the third sheet is fed.

The control unit 3 causes the first sheet S1 to be discharged to the reusable sheet tray 15 (Act 14) when the determination result is that the first sheet S1 is reusable (Act 13: YES) as shown in FIG. 9. The control unit 3 causes the first sheet S1 to be discharged to the non-reusable sheet tray 16 (Act 15) when the determination result is that the first sheet S1 is not reusable (Act 13: NO) as shown in FIG. 9.

The control unit 3 causes the first sheet S1 that stands by between the scanning unit 13 and the decoloring unit 14 to be discharged to the non-reusable sheet tray 16 (Act 16) when the decoloring possibility determination result is that the first sheet S1 is not decolorable (Act 9: NO). Subsequently, the control unit 3 causes the scanning unit 13 to scan the image on the second sheet S2 (Act 17), and causes the decoloring unit 14 to decolor the image on the second sheet S2 (Act 18).

The control unit 3 causes the scanning unit 13 to scan the decolored surface of the second sheet S2 subjected to the decoloring process to transmit the image data to the management device 7 (Act 19).

As shown in FIG. 9, the control unit 3 feeds a third sheet S3 (following sheet) to the sheet conveying path 2 (Act 20)

leaving the calculated sheet feeding interval after the second sheet S2 (preceding sheet) is fed.

The management device 7 performs reuse possibility determination to determine that the second sheet S2 is reusable based on the image data and transmits the determination result to the decoloring device 1.

The control unit 3 receives the reuse possibility determination result (Act 21).

The control unit 3 causes the second sheet S2 to be discharged to either sheet tray 15 or 16 based on the reuse possibility determination result (Acts 23 and 24).

After that, returning to Act 6, the control unit 3 performs the same process for the third sheet S3 as the process for the first sheet S1, causes a fourth sheet to be fed leaving the calculated sheet feeding interval after the third sheet S3 is fed, and performs the same process for the fourth sheet as the process for the second sheet S2 (Acts 6 to 23).

In the embodiment, the control unit 3 calculates the time taken for the decoloring device 1 to receive the determination results (the decoloring possibility determination result and the reuse possibility determination result) from the start of sheet feeding based on the ability data including the performance of the memory, the processor, or the like of the management device 7 received therefrom. Then, based on the time, the control unit 3 feeds the following sheet to the sheet conveying path 2 at the timing (sheet feeding interval) at which the leading end of the following sheet does not run into the tail end of the preceding sheet even when the preceding sheet is held until the determination results are received. For that reason, it is possible to prevent sheet jams from occurring without causing the following sheet to run into the preceding sheet that stands by between the scanning unit 13 and the decoloring unit 14 even if it takes time for the management device 7 to render the determination.

In addition, in order to prevent the following sheet from running into the preceding sheet, it is considered that, for example, the preceding sheet is fed and the following sheet is fed after the determination results for the preceding sheet is received. With the configuration, it is possible to prevent the following sheet from running into the preceding sheet as the following sheet is not fed from the start even if it takes time for the management device 7 to render determination.

Different from the method, in the embodiment, the following sheet can be fed at the calculated sheet feeding interval before the determination results produced by the management device 7 are received. For that reason, in the embodiment, it is possible to reduce the loss of time by the waiting time for the determination results produced by the management device 7 and to consecutively decolor images on sheets in a short period of time.

(Second Embodiment)

Hereinbelow, the same functional portions as those in the above embodiment are given the same reference numerals, and description thereof will be omitted.

In the above embodiment, the management device 7 transmits the ability data used by the decoloring device 1 to calculate the time taken for the decoloring device 1 to receive the determination results after the start of sheet feeding. The management device 7 (reception time indication data transmission section), however, may calculate (A) the time taken for the management device 7 to finish determination from completing reception of image data and (B) the time taken for the management device 7 to complete reception of the image data by itself, and transmit the calculated times to the decoloring device 1 as reception time indication data. In addition, the decoloring device 1 may calculate an sheet feeding interval taking (C) the time taken for the decoloring device 1 to start transmission of the image data from the start of sheet feeding into consideration in addition to (A) the time taken for the management device 7 to finish determination from completing reception of image data and (B) the time taken for the management device 7 to complete reception of the image data.

The time when the management device 7 transmits reception time indication data to the decoloring device 1 may be the time when the decoloring device 1 checks connection to the management device after the power is on, or the time when a decoloring process starts, that is, when a first sheet is fed.

(Third Embodiment)

Figure 10:
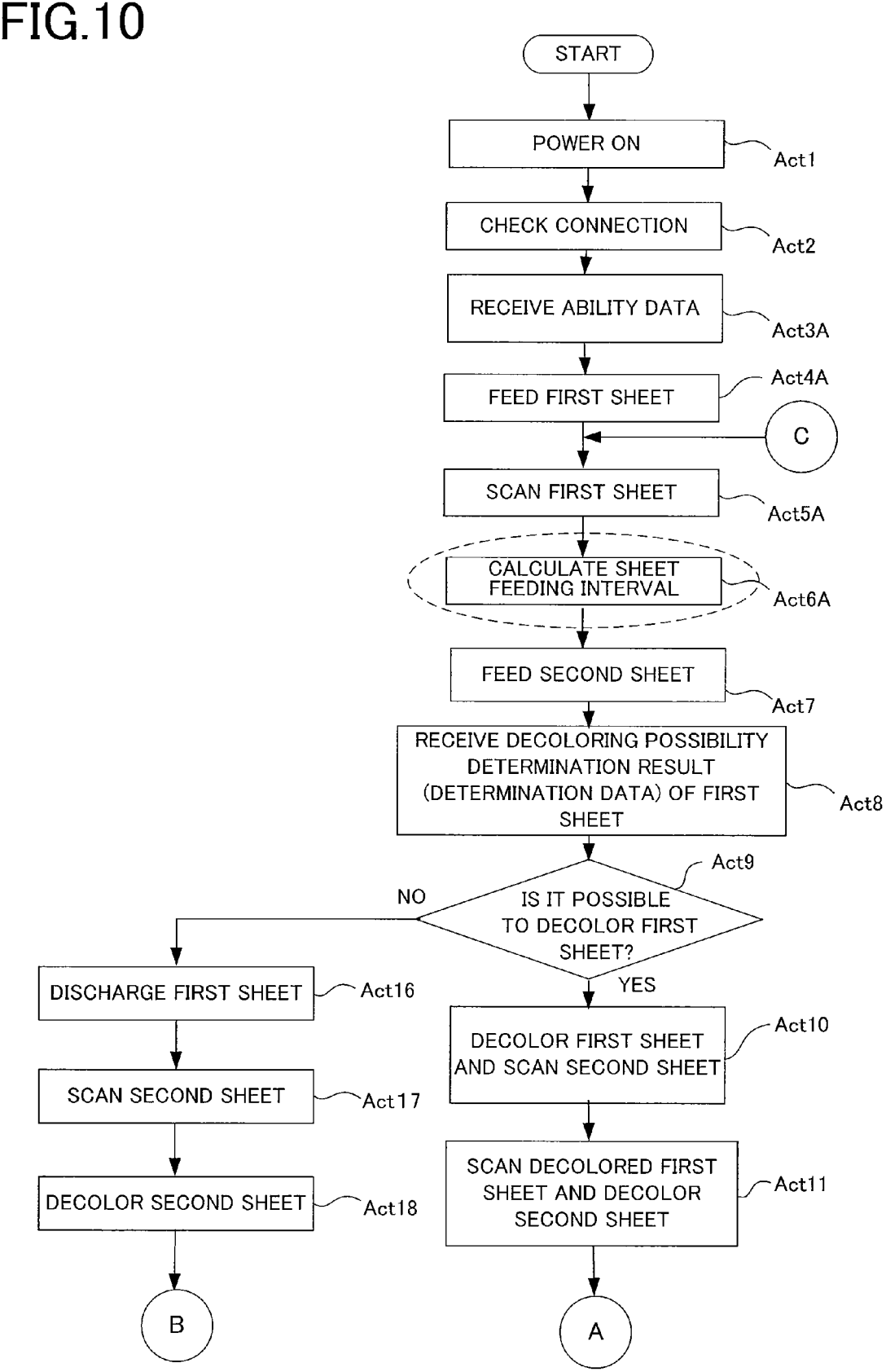
FIG. 10 is a flowchart for illustrating a method of other decoloring process by the decoloring device.

FIG. 10 is a flowchart showing a part of a decoloring process by the decoloring device 1.

In previous embodiments, the control unit 3 of the decoloring device 1 calculates the sheet feeding interval when the connection to the management device is checked after the power is on or when the decoloring process is started.

In the present embodiment, the control unit 3 calculates the sheet feeding interval (Act 6A) after images of the preceding sheet are scanned (Act 5A).

In the embodiment, the control unit 3 calculates the time taken for the decoloring device 1 to receive determination results from the start of sheet feeding, taking the size of image data in addition to ability data of the management device 7 into consideration.

Specifically, the control unit 3 calculates the time taking the size of the image data in addition to the rate of execution of a data bus into consideration, when (B) the time taken for the management device 7 to complete reception of the image data is calculated. In addition, the control unit 3 calculates the time taking the size of the image data to be processed in addition to the performance of the memory, the processor, or the like of the management device 7 into consideration when (A) the time taken for the management device 7 to finish determination from completing reception of the image data is calculated.

The control unit 3 calculates the time taken for the decoloring device 1 to receive determination results from the start of sheet feeding, taking (C) the time taken for the decoloring device 1 to start transmission of the image data from the start of sheet feeding in addition to (A) and (B) into consideration. Then, the control unit 3 calculates the sheet feeding interval at which the leading end of the following sheet does not run into the tail end of the preceding sheet from the time even if the preceding sheet is held until determination results are received.

The control unit 3 feeds the following sheet leaving the calculated sheet feeding interval after the preceding sheet is fed (Act 7).

In the embodiment, since the size of the image data of the preceding sheet is taken into consideration when the sheet feeding interval is calculated, it is possible to calculate the sheet feeding interval with more accuracy.

Furthermore, since the procedure of other processes is the same as that in the first embodiment, description thereof will be omitted.

(Fourth Embodiment)

In the present embodiment, a management device 7A calculates the sheet feeding interval.

Figure 11:
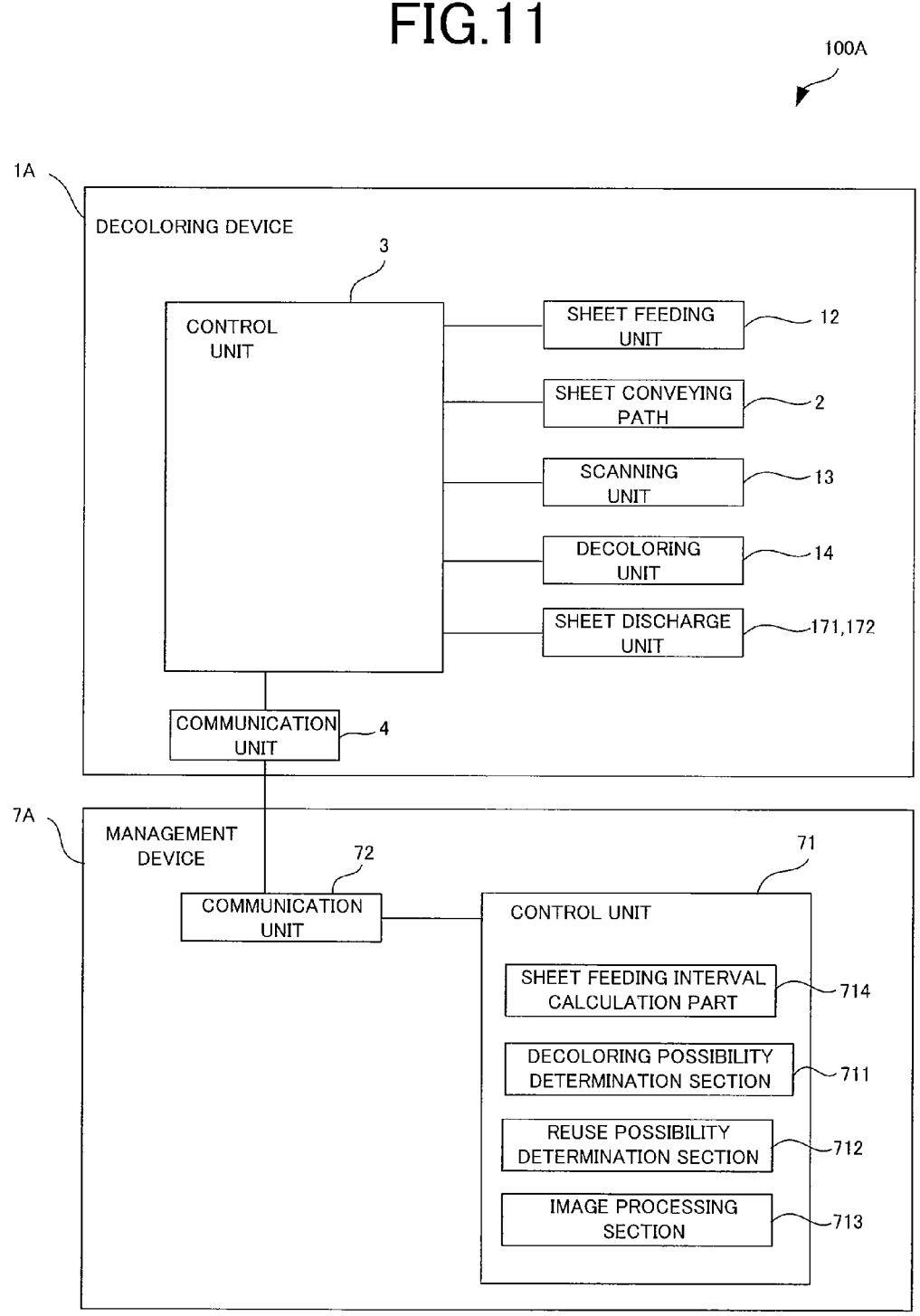
FIG. 11 is a functional block diagram of a decoloring device and a management device.
Figure 12:
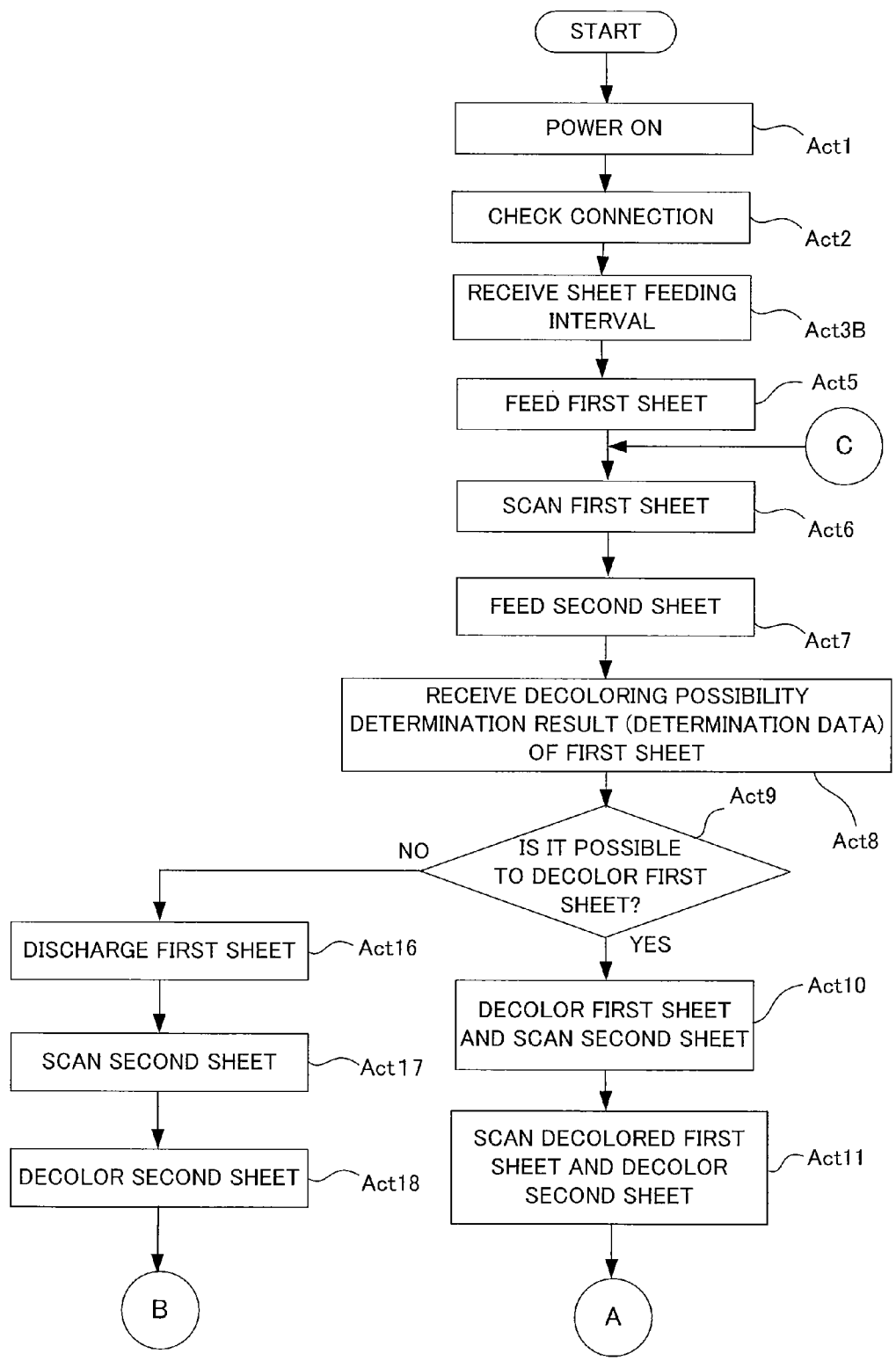
FIG. 12 is a flowchart showing a part of a decoloring process by a control unit of the decoloring device.

FIG. 11 is a functional block diagram of a decoloring device 1A and the management device 7A. FIG. 12 is a flowchart showing a part of a decoloring process by the decoloring device 1A.

A control unit 71 of the management device 7A includes a sheet feeding interval calculation part 714.

The management unit 7A (sheet feeding interval calculation part 714) calculates the sheet feeding interval (reception time indication data) when connection of the management device 7A to the decoloring device 1A is checked (Act 2).

Specifically, the management device 7A calculates (A) the time taken for the management device 7A to finish determination from completing reception of image data based on the performance of a memory or a processor. In addition, the management device 7A calculates (B) the time taken for the management device 7A to complete reception of the image data based on the rate of execution of the data bus. In addition, a prescribed value is used for calculating (C) the time taken for the decoloring device 1A to start transmission of the image data from the start of sheet feeding. The management device 7A calculates the sheet feeding interval taking the times into consideration and transmits the result to the decoloring device 1A.

The decoloring device 1A receives the sheet feeding interval from the management device 7A when the connection to the management device 7A is checked (Act 3B). The procedure of other processes is the same as that in the first embodiment.

In the embodiment, since the decoloring device 1A may be made not to calculate the sheet feeding interval, the price of the decoloring device 1A can be dropped.

(Fifth Embodiment)

Figure 13:
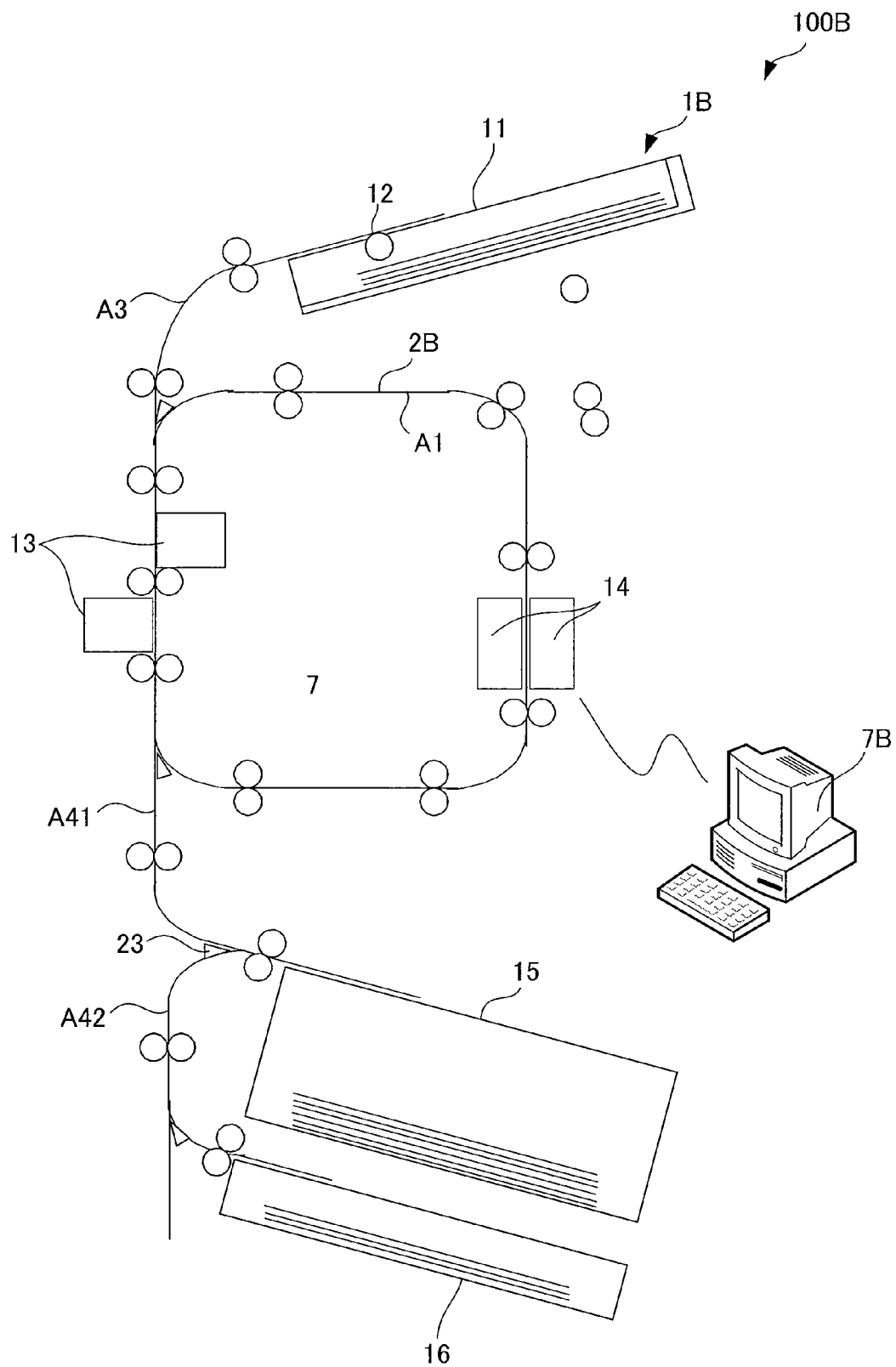
FIG. 13 is a schematic diagram showing a modified example of a sheet conveying path.

FIG. 13 is a schematic diagram showing a sheet conveying path 2B of a modified example.

In each of previous embodiments, the position of each unit on the sheet conveying path is arbitrary. FIG. 13 shows the sheet conveying path 2B of the modified example in which the position of each unit is deviated on the sheet conveying path.

In the present embodiment, the junction of a sheet conveying path A3 from the sheet feeding unit 12 to the circular-shaped sheet conveying path A1 and the circular-shaped sheet conveying path A1 is located in the scanning unit 13 side, not in the decoloring unit 14 side. In addition, the reusable sheet tray 15 is connected between the scanning unit 13 and the decoloring unit 14 on the circular-shaped sheet conveying path A1 by a sheet discharge conveying path A41. The non-reusable sheet tray 16 is located on the downstream side of the reusable sheet tray 15 in the sheet conveying direction on the sheet conveying path 2B and connected to the sheet tray 15 by a sheet discharge conveying path A42. In the embodiment also, a decoloring device 1B can execute the same decoloring process as in each previous embodiments.

(Sixth Embodiment)

Figure 14:
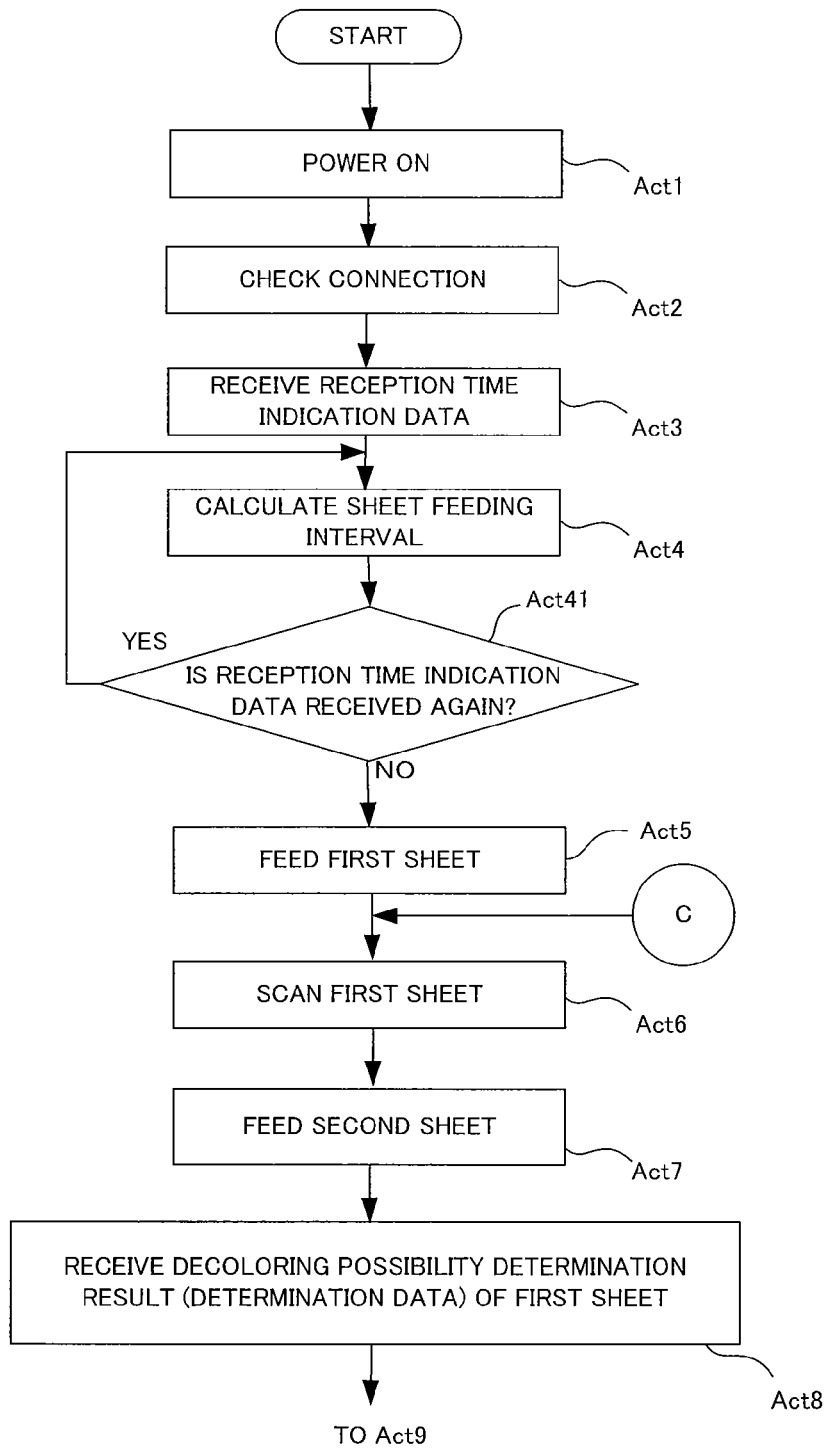
FIG. 14 is a flowchart showing a part of a decoloring process by the decoloring device.

FIG. 14 is a flowchart showing a part of the decoloring process by the decoloring device 1.

When the management device 7 performs a process (for example, a process by other application) other than the generation of determination data (the decoloring possibility determination result and reuse possibility determination result) and reception time indication data by other user while the management device 7 performs an image processing, or the like based on image data transmitted from the decoloring device 1 and generates the determination data and the reception time indication data, process load of the management device 7 by the process other than the generation of the reception time indication data and the like increases, and a generation processing time of the reception time indication data and the like is lengthened. For that reason, it is difficult to say that feeding sheets at a sheet feeding interval based on the reception time indication data before the processing load increases is optimum in light of reduction of sheet feeding time.

Thus, in the present embodiment, when the management device 7 starts a process other than the generation of the determination data and the reception time indication data before the decoloring device 1 feeds, for example a first sheet (ACT 5), the management device 7 generates the reception time indication data again taking the increase in the processing load (for example, an increase in the use amount of a memory) into consideration. For example, the management device 7 generates again reception time indication data including an increment of the use amount of the memory as data to be used by the decoloring device 1 for calculating ((A) the time taken for the management device 7 to finish determination from completing reception of the image data).

When the reception time indication data is received again from the management device 7 (ACT 41: YES), the decoloring device 1 calculates a sheet feeding interval again (ACT 4), and feeds sheets based on a further optimized sheet feeding interval (ACT 5~).

In addition, in the embodiment, when the process other than the generation of the determination data and the reception time indication data is completed, reception time indication data including the use amount of the memory or the like is generated again. The management device 7 calculates an optimum sheet feeding interval again based on the reception time indication data with the reduced use amount of the memory.

In the embodiment, even if the time taken for the management device 7 to perform a determination process is lengthened further than a presumed processing time due to the management device 7 performing a process other than a process relating to decoloring by the decoloring device 1, sheet feeding can be smoothly performed for a short period of time because the decoloring device 1 calculates a sheet feeding interval according to the processing time again. In addition, even if the process other than the process relating to decoloring is completed by the management device 7 and the time taken for the management device 7 to perform a determination process is shortened further than a presumed processing time (increased processing time), sheet feeding can be smoothly performed for a short period of time because the decoloring device 1 calculates a sheet feeding interval according to the processing time again.

Furthermore, the decoloring device 1 may calculate a sheet feeding interval again even if the reception time indication data is received again from the management device 7 at any timing.

In the previous embodiments, the management devices 7, 7A, and 7B determines whether or not a sheet is decolorable, or whether or not a sheet decolored is reusable, but the management devices 7, 7A and 7B may specifically determine the conveyance destination of a sheet, for example the decoloring unit 14 or the non-reusable sheet tray 16 based on decoloring possibility determination and reuse possibility determination.

As a recording medium, as long as the recording medium can store programs and is readable by a computer, any form of medium is possible. Specifically, as a recording medium, for example, an internal storage device including a ROM, a RAM, or the like, mounted inside a computer, a portable storage medium including a CD-ROM, a flexible disk, a DVD, a magneto-optical disc, an IC card, or the like, a database that retains computer programs, another computer and database thereof, or the like can be exemplified. A function obtained by installation or downloading may be realized in cooperation with an OS in a device, or the like. A part or all of a program may be a dynamically produced execution module.

The order of each process in each embodiment may be different from that exemplified in the above embodiments.

As described above, according to the technology described in the present specification, it is possible to provide a technology of consecutively decoloring images on a plurality of sheets.

While certain embodiments have been described, these embodiments have been presented by way of example only, and are not intended to limit the scope of invention. Indeed, the novel apparatus, methods and system described herein may be embodied in a variety of other forms; furthermore, various omissions, substitutions and changes in the form of the apparatus, methods and system described herein may be made without departing from the spirit of the inventions. The accompanying claims and their equivalents are intended to cover such forms or modifications as would fall within the scope and spirit of the inventions.

What is claimed is:

1. A decoloring device which decolors an image on a sheet, comprising:
    a sheet conveying path which conveys the sheet inside the device;
    a sheet feeding unit which feeds the sheet on which the image is formed with a decolorable colorant to the sheet conveying path from a sheet-stacking part;
    a scanning unit which is provided downstream of the sheet feeding unit on the sheet conveying path and scans the image on the sheet;
    a communication unit which transmits image data of a preceding sheet scanned by the scanning unit to a management device communicating with the decoloring device, receives from the management device determination data based on the image data and indicates at least whether or not the preceding sheet is reusable, and receives ability data of the management device or first reception time indication data, both of which are related to time taken for the decoloring device to receive the determination data from the management device;
    a decoloring unit which is provided downstream of the scanning unit on the sheet conveying path and decolors the image on the sheet; and
    a control unit which conveys the preceding sheet to a predetermined conveyance destination based on the determination data and feeds sheets with a first sheet feeding interval at which a leading end of a following sheet does not run into a tail end of a preceding sheet even if the preceding sheet is held until the determination data is received based on the first reception time indication data wherein:
    the management device transmits a second reception time indication data when a process other than the generation of the determination data and the first reception time indication data is started, or when the process other than the generation of the determination data and the first reception time indication data is ended, and
    the control unit calculates a second sheet feeding interval at which the leading end of the following sheet does not run into the tail end of the preceding sheet even if the preceding sheet is held until the determination data is received, based on the second reception time indication data transmitted from the management device, and feeds the following sheet to the sheet conveying path leaving the second sheet feeding interval after the preceding sheet is fed to the sheet conveying path.

2. The device according to claim 1, wherein
    the determination data includes a determination result by the management device on whether or not image data of the preceding sheet includes prohibited data for which decoloring is prohibited, and
    the control unit controls the preceding sheet to be conveyed to the decoloring unit when the determination result is that the image data of the preceding sheet does not include prohibited data, and controls the preceding sheet to be conveyed to a non-reusable sheet tray that accommodates non-reusable sheets when the determination result is that the image data of the preceding sheet includes prohibited data.

3. The device according to claim 1, wherein
    the determination data includes a determination result by the management device on whether or not a quantity of decoloring residue of the decolored preceding sheet is equal to or greater than a predetermined quantity, and
    the control unit controls the preceding sheet to be conveyed to a non-reusable sheet tray that accommodates non-reusable sheets when the determination result is that the quantity of decoloring residue of the decolored preceding sheet is equal to or greater than the predetermined quantity, and controls the preceding sheet to be conveyed to a reusable sheet tray that accommodates reusable sheets when the determination result is that the quantity of decoloring residue of the decolored preceding sheet is equal to or smaller than the predetermined quantity.

4. The device according to claim 1, wherein the first reception time indication data is the first sheet feeding interval produced by the management device taking a production time of the determination data and a communication time between the management device and the decoloring device into consideration, and the first sheet feeding interval at which the leading end of the following sheet does not run into the tail end of the preceding sheet even if the preceding sheet is held until the decoloring device receives the determination data.

5. The device according to claim 1, wherein
    the ability data is the size of a memory in the management device involved in a production of the determination data by the management device, and
    the control unit controls a production time of the determination data by the management device to be calculated based on a memory size, and controls the following sheet to be fed with the first sheet feeding interval at which the leading end of the following sheet does not run into the tail end of the preceding sheet based on the production time of the determination data even if the preceding sheet is held until the determination data is received.

6. The device according to claim 1, wherein
    the ability data is the performance and the number of processors involved in a production of the determination data by the management device, and
    the control unit controls a production time of the determination data by the management device to be calculated based on a performance and a number of processors, and controls the following sheet to be fed to the sheet conveying path with the first sheet feeding interval at which the leading end of the following sheet does not run into the tail end of the preceding sheet based on the production time of the determination data even if the preceding sheet is held until the determination data is received.

7. The device according to claim 1, wherein
    the ability data is a model number of the management device, and
    the control unit controls a production time of the determination data by the management device to be calculated based on the model number of the management device, and controls the following sheet to be fed to the sheet conveying path with the first sheet feeding interval at which the leading end of the following sheet does not run into the tail end of the preceding sheet based on the production time of the determination data even if the preceding sheet is held until the determination data is received.

8. The device according to claim 1, wherein the ability data or the first reception time indication data is received when the decoloring device starts a decoloring process for the preceding sheet.

9. The device according to claim 1, wherein the ability data or the reception time indication data is received when a power of the decoloring device is on and a connection to the management device is checked.

10. The device according to claim 1, wherein there is a branch point downstream of the scanning unit in the sheet conveyance direction, at which a sheet discharge conveying path for discharging sheets and a decoloring conveyance path for conveying sheets to the decoloring unit are branched, and the sheet feeding unit and the scanning unit are disposed downstream of the decoloring unit in the sheet conveying direction on the sheet conveying path.

11. A management device which communicates with a decoloring device including a sheet conveying path which conveys a sheet to each unit therein, a sheet feeding unit which feeds a sheet on which an image is formed with a decolorable colorant to the sheet conveying path from a sheet-stacking part, a scanning unit which is provided downstream of the sheet feeding unit on the sheet conveying path and scans an image on a sheet, a communication unit which transmits image data of a preceding sheet scanned by the scanning unit, and a decoloring unit which is provided downstream of the scanning unit on the sheet conveying path and decolors an image on a sheet, wherein
the management device transmits to the decoloring device determination data which indicates at least whether or not the preceding sheet is reusable is produced based on the image data, thereby causing the preceding sheet to be conveyed to a predetermined conveyance destination in the decoloring device based on the determination data,
the management device transmits to the decoloring device ability data of the management device and a first reception time indication data, both of which are related to time taken for the decoloring device to receive the determination data from the management device, thereby causing a following sheet to be fed to the sheet conveying path with a first sheet feeding interval at which the leading end of the following sheet does not run into the tail end of the preceding sheet based on the ability data and the reception time indication data even if the preceding sheet is held until the determination data is received in the decoloring device, and
the management device transmits to the decoloring device a second reception time indication data when a process other than the generation of the determination data and the first reception time indication data is started, or when the process other than the generation of the determination data and the first reception time indication data is ended, thereby causing the following sheet to be fed to the sheet conveying path with a second sheet feeding interval at which the leading end of the following sheet does not run into the tail end of the preceding sheet even if the preceding sheet is held until the determination data is received, based on the second reception time indication data.

12. The device according to claim 11, wherein
the determination data includes a determination result by the management device on whether or not image data of the preceding sheet includes prohibited data for which decoloring is prohibited, and
the preceding sheet is conveyed to the decoloring unit when the determination result is that the image data of the preceding sheet does not include prohibited data, and controls the preceding sheet to be conveyed to a non-reusable sheet tray that accommodates non-reusable sheets when the determination result is that the image data of the preceding sheet includes prohibited data.

13. The device according to claim 11, wherein
the determination data includes a determination result by the management device on whether or not a quantity of decoloring residue of the decolored preceding sheet is equal to or greater than a predetermined quantity, and
the preceding sheet is conveyed to a non-reusable sheet tray that accommodates non-reusable sheets when the determination result is that the quantity of decoloring residue of the decolored preceding sheet is equal to or greater than the predetermined quantity, and the preceding sheet is conveyed to a reusable sheet tray that accommodates reusable sheets when the determination result is that the quantity of decoloring residue of the decolored preceding sheet is equal to or smaller than the predetermined quantity.

14. The device according to claim 11, wherein the first reception time indication data is the sheet feeding interval produced by the management device taking a production time of the determination data and a communication time between the management device and the decoloring device into consideration, and the first sheet feeding interval at which the leading end of the following sheet does not run into the tail end of the preceding sheet even if the preceding sheet is held until the decoloring device receives the determination data.

15. The device according to claim 11, wherein
the ability data is a capacity of a memory of the management device involved in a production of the determination data by the management device, and
the production time of the determination data by the management device is calculated based on the capacity of the memory, and the following sheet is fed to the sheet conveying path with the first sheet feeding interval at which the leading end of the following sheet does not run into the tail end of the preceding sheet based on the production time of the determination data even if the preceding sheet is held until the determination data is received.

16. The device according to claim 11, wherein
the ability data is a model number of the management device, and
a production time of the determination data by the management device is calculated based on the model number of the management device, and the following sheet is fed to the sheet conveying path with the first sheet feeding interval at which the leading end of the following sheet does not run into the tail end of the preceding sheet based on the production time of the determination data even if the preceding sheet is held until the determination data is received.

17. The device according to claim 11, wherein the ability data or the first reception time indication data is transmitted when the decoloring device starts a decoloring process for the preceding sheet.

18. The device according to claim 11, wherein the ability data or the reception time indication data is transmitted when a power of the decoloring device is on, and a connection to the decoloring device is checked.

19. A decoloring system comprising:

a decoloring device including a sheet conveying path which conveys a sheet, a sheet feeding unit which feeds a sheet on which an image is formed with a decolorable colorant to the sheet conveying path from a sheet-stacking part, a scanning unit which is provided downstream of the sheet feeding unit on the sheet conveying path and scans an image on a sheet, a communication unit which transmits image data of a preceding sheet scanned by the scanning unit, and a decoloring unit which is provided downstream of the scanning unit on the sheet conveying path and decolors an image on a sheet; and a management device which communicates with the decoloring device, produces determination data which indicates at least whether or not the preceding sheet is reusable based on the image data and then transmits the determination data to the decoloring device, thereby causing the preceding sheet to be conveyed to a predetermined conveyance destination in the decoloring device based on the determination data, and transmits ability data of the management device or a first reception time indication data, both of which are related to time taken for the decoloring device to receive the determination data to the decoloring device, thereby causing a following sheet to be fed to the sheet conveying path with a first sheet feeding interval at which the leading end of the following sheet does not run into the tail end of the preceding sheet based on the ability data or the reception time indication data even if the preceding sheet is held until the determination data is received in the decoloring device, wherein the management device transmits to the decoloring device a second reception time indication data when a process other than the generation of the determination data and the first reception time indication data is started, or when the process other than the generation of the determination data and the first reception time indication data is ended, thereby causing the following sheet to be fed to the sheet conveying path with a second sheet feeding interval at which the leading end of the following sheet does not run into the tail end of the preceding sheet even if the preceding sheet is held until the determination data is received, based on the second reception time indication data.

* * * * *